(12) United States Patent
Fujii et al.

(10) Patent No.: US 6,265,809 B1
(45) Date of Patent: Jul. 24, 2001

(54) DRIVE CIRCUIT FOR ULTRASONIC MOTOR

(75) Inventors: Hiroaki Fujii; Ryuji Yano; Hitoshi Fujita; Kenji Kitazawa, all of Echi-gun (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/390,323

(22) Filed: Sep. 7, 1999

(30) Foreign Application Priority Data

Sep. 16, 1998 (JP) .................................................. 10-261471
Sep. 22, 1998 (JP) .................................................. 10-267968

(51) Int. Cl.[7] .................................................. H02N 2/00
(52) U.S. Cl. .......................................................... 310/317
(58) Field of Search ........................ 310/316.01, 316.02, 310/317

(56) References Cited

U.S. PATENT DOCUMENTS

| 5,121,023 | * | 6/1992 | Abel ................................ 310/316.02 |
| 5,436,521 | * | 7/1995 | Kataoka ................................ 310/317 |
| 6,049,156 | * | 4/2000 | Yamamoto et al. ............ 310/316.01 |
| 6,072,267 | * | 6/2000 | Atsuta .............................. 310/316.02 |
| 6,121,714 | * | 9/2000 | Atsuta .............................. 310/316.01 |
| 6,147,434 | * | 11/2000 | Nakano et al. ....................... 310/317 |

FOREIGN PATENT DOCUMENTS

| 5-252763 | * | 9/1993 | (JP) ................................. 310/316.02 |
| 6-237583 | * | 8/1994 | (JP) ................................. 310/316.02 |
| 6-269180 | * | 9/1994 | (JP) ................................. 310/316.02 |

\* cited by examiner

*Primary Examiner*—Thomas M. Dougherty
(74) *Attorney, Agent, or Firm*—Kanesaka & Takeuchi

(57) ABSTRACT

A drive circuit for an ultrasonic motor includes a DC power source, a transformer for applying to the ultrasonic motor two phase high frequency voltage alternating currents having a predetermined phase difference for driving the ultrasonic motor, a switching device interposed between the DC power source and the transformer for allowing a direct current from the direct DC power source to flow to the transformer at a predetermined timing, and a CPU connected to the switching device for controlling the switching device at the predetermined timing. Thus, the alternating current having an optimum frequency can be reliably and easily obtained. The drive circuit may include a vibration attenuating device operated when the ultrasonic motor is stopped. As a result, vibration of a stator of the ultrasonic motor is gradually reduced.

11 Claims, 16 Drawing Sheets

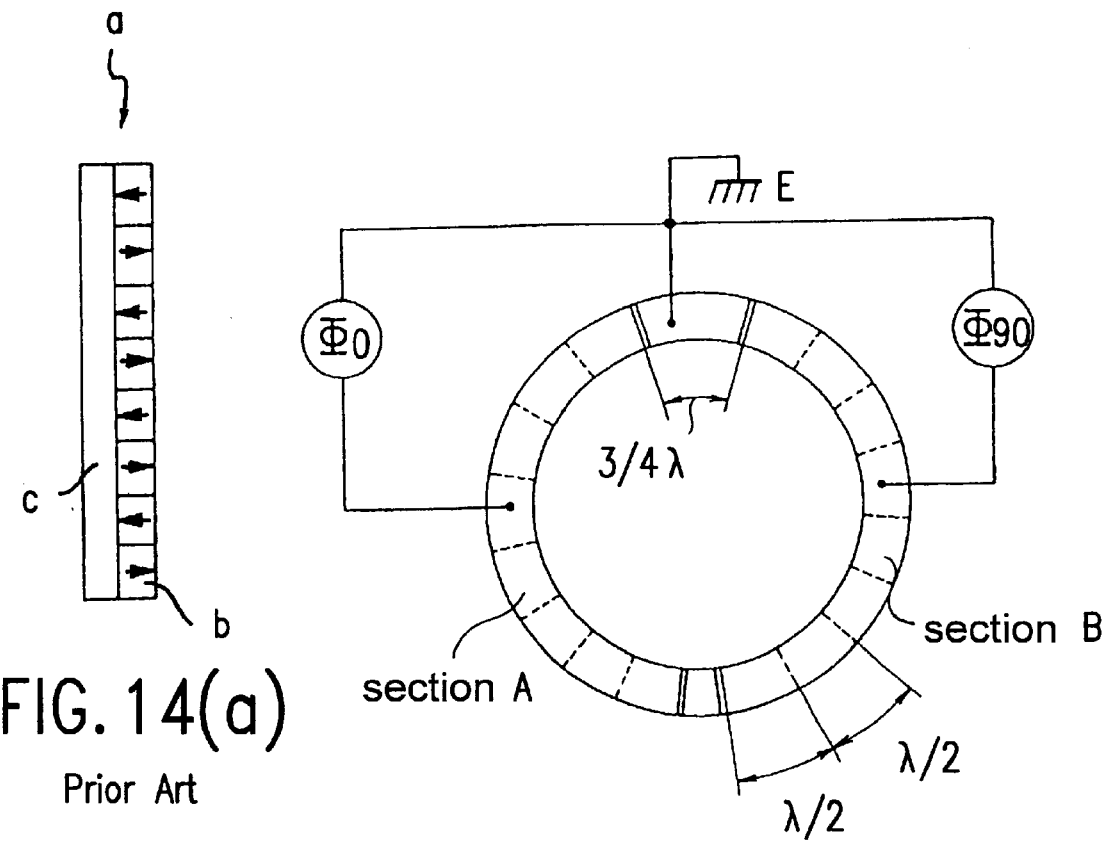
FIG. 14(a)
Prior Art
FIG. 14(b)
Prior Art
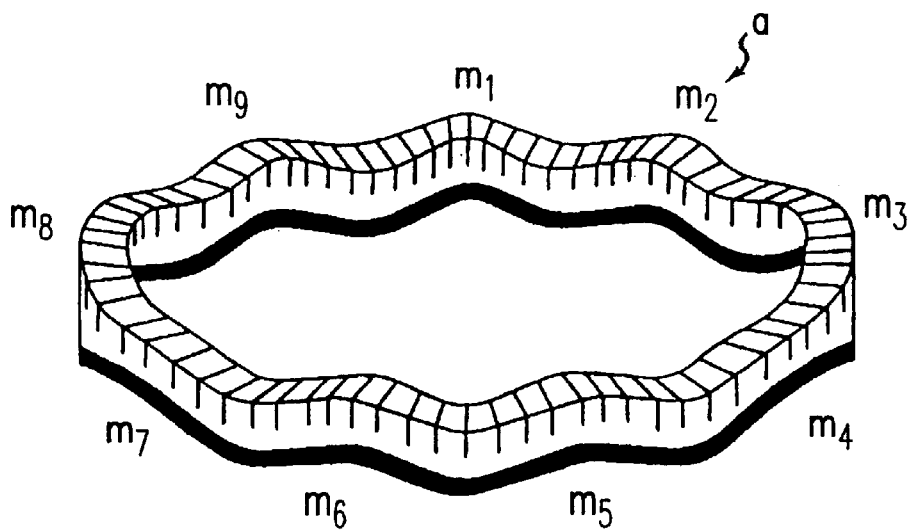
FIG. 15
Prior Art

DRIVE CIRCUIT FOR ULTRASONIC MOTOR

BACKGROUND OF THE INVENTION AND RELATED ART STATEMENT

The present invention relates to a drive circuit for an ultrasonic motor, in particular a drive circuit for an ultrasonic motor for producing a high voltage alternating current necessary for operating a progressive or traveling type ultrasonic motor and for suppressing a noise when the ultrasonic motor is stopped.

Heretofore, various ultrasonic motors have been developed, wherein a traveling type ultrasonic motor among them is operated according to the following theory. In detail, when a vertical wave and a lateral wave are synthesized on a surface of an elastic member as a stator to form a traveling wave transmitted in a longitudinal direction of the elastic member at a sonic speed, the surface of the elastic member starts elliptically vibrating due to the traveling wave. When a rotor contacts the surface of the elliptically vibrating elastic member under pressure, the rotor contacts peaks of the elastic member by the elliptical vibrations, and starts moving in a direction opposite to the traveling wave at a vibrating speed by friction between the rotor and the stator.

In order to form the traveling wave on the elastic member as the stator of the traveling type ultrasonic motor as described above, a curved elastic wave is used. A method for generating the curved elastic wave is described hereunder. As shown in FIG. 14(a), the stator a is formed by bonding a piezoelectric member b, i.e. piezoelectric ceramic, where the adjacent components are alternately polarized in the thickness direction, to the elastic member c. In the drawing, the respective arrows in the piezoelectric member b show the polarized directions.

In case a high frequency voltage is applied to the piezoelectric ceramic b, if the applied frequency is equal to an inherent frequency of the stator a, the stator a resonates to make curved vibrations in a circumferential direction as shown in FIG. 15. In case the vibrating waves of the stator a are divided into, for example, nine wavelengths in the circumferential direction as shown in FIG. 15, nine wave peaks $m_1$ to $m_9$ are formed and called standing waves.

On the other hand, as shown in FIGS. 14(b) and 16, in case phases of mutual positions of section A and section B of the piezoelectric ceramic 2 are shifted by ¾ wavelength (λ) of the applied high frequency voltage, and high frequency voltages $\Phi_0$, $\Phi_{90}$ having a timewise phase difference of 90° are applied to the section A and section B, respectively, the standing waves are generated by the respective high frequency voltages $\Phi_0$, $\Phi_{90}$ as described above. These standing waves interfere with each other to be synthesized, so that the traveling wave is formed.

Incidentally, while an alternating current of high frequency voltages $\Phi_0$, $\Phi_{90}$ having a timewise phase difference of 90° as described above is required as an electric power necessary for operating the ultrasonic motor, in order to raise an efficiency of the ultrasonic motor, it is also necessary to allow the alternate current to have an optimum frequency. Also, it is required to improve reliability of the drive circuit for the ultrasonic motor. Moreover, it is required for the drive circuit for the ultrasonic motor to easily produce the alternating current.

Further, the alternating current with high frequency voltages $\Phi_0$, $\Phi_{90}$ is preferably controlled by pulse control. When the ultrasonic motor is controlled by the pulse control, in order to stop the ultrasonic motor, the pulse may be stopped. When the pulse is stopped, as shown in FIG. 17, the electric power supplied to the ultrasonic motor is shut off instantaneously.

On the other hand, during the operation of the ultrasonic motor, the rotor R rotates by the traveling wave based on the elliptical vibration of the stator S. At this time, as shown in FIG. 18, the rotor R is lifted by the heads of the traveling wave in the stator S from other portions of the stator S. When the motor apply voltage is suddenly shut off by stopping the pulse, as shown in FIG. 19, the stator S stops the elliptical vibration immediately to extinguish the traveling wave. Thus, a situation appears such that the stator S and rotor R are instantaneously spaced from each other. However, since the rotor R is pressed against the stator S by a spring H, after the condition as shown in FIG. 19, the rotor R closely contacts the stator S, as shown in FIG. 20. At this time, there is produced a noise when the rotor R contacts the stator S, which is referred to hereinafter as "stopping noise" in the specification.

In this case, since the vibration sound of the ultrasonic motor is relatively low, the stopping noise is relatively noticeable. Sometimes, the stopping noise causes uncomfortable feeling.

In consideration of the above-mentioned requirements and situation, the present invention has been made, and an object of the invention is to provide a drive circuit for an ultrasonic motor, wherein an alternating current for driving the ultrasonic motor can be easily produced from a direct current.

Another object of the invention is to provide a drive circuit for an ultrasonic motor as stated above, wherein an alternating current to be applied to the ultrasonic motor has an optimum frequency.

A further object of the invention is to provide a drive circuit for an ultrasonic motor as stated above, wherein a reliability of the drive circuit for the ultrasonic motor can be improved.

A still further object of the invention is to provide a drive circuit for an ultrasonic motor as stated above, wherein the stopping noise of the ultrasonic motor is reduced as little as possible to thereby provide quietness in all the operation range of the ultrasonic motor.

Further objects and advantages of the invention will be apparent from the following description of the invention.

SUMMARY OF THE INVENTION

To attain the above objects, according to a first aspect of the invention, a drive circuit for an ultrasonic motor for producing an alternating current with high voltage necessary for operating the ultrasonic motor is formed of a direct current power source (hereinafter referred to as DC power source); a transformer for applying to the ultrasonic motor a two phase high frequency voltage alternating current having a predetermined phase difference for driving the ultrasonic motor; a switching device for allowing a direct current from the DC power source to flow through the transformer at a predetermined timing; and a central processing unit (hereinafter referred to as CPU) for operating the switching device at the predetermined timing.

According to a second aspect of the invention, a temperature detecting device for monitoring a temperature rise of the switching device is provided. When a temperature of the switching device detected by the temperature detecting device is higher than a first set temperature, the CPU stops driving of the ultrasonic motor or lowers an output of the ultrasonic motor.

According to a third aspect of the invention, when a temperature of the switching device detected by the temperature detecting device is higher than a first set temperature, the CPU stops driving of the ultrasonic motor or lowers the output of the ultrasonic motor less than a first predetermined output. Then, when the temperature becomes lower than a second set temperature lower than the first set temperature, the ultrasonic motor is re-driven at an output higher than the first predetermined output.

According to a fourth aspect of the invention, a temperature detecting device for monitoring a temperature rise of the transformer is provided. When a temperature of the transformer detected by the temperature detecting device is higher than a second set temperature, the CPU stops driving of the ultrasonic motor or lowers an output of the ultrasonic motor.

According to a fifth aspect of the invention, when a temperature of the transformer detected by the temperature detecting device is higher than a third set temperature, the CPU stops driving of the ultrasonic motor or reduces an output of the ultrasonic rotor lower than a second predetermined output. Then, when the temperature becomes lower than a fourth set temperature lower than the third set temperature, the ultrasonic motor is re-driven at an output higher than the second predetermined output.

According to a sixth aspect of the invention, an information signal of a rotating condition of the ultrasonic motor is supplied to the CPU, and when the CPU detects a fault of the ultrasonic motor based on the information signal, the ultrasonic motor is stopped.

According to a seventh aspect of the invention, a drive circuit of an ultrasonic motor for producing a high voltage alternating current necessary for driving the ultrasonic motor is formed of a DC power source; a direct current high voltage conversion device for converting a direct current from the DC power source into direct current high voltages with a plus electric potential and a minus electric potential; a switching device for allowing the direct current high voltages with the plus electric potential and the minus electric potential from the direct current high voltage conversion device to flow to the ultrasonic motor at a predetermined timing; and a CPU for operating the witching device at the predetermined timing.

According to an eighth aspect of the invention, there is provided a sine wave conversion device for converting an output from the switching device into a sine wave to apply to the ultrasonic motor.

According to a ninth aspect of the invention, the CPU sets an operation timing of the switching device based on an external information of the ultrasonic motor.

According to a tenth aspect of the invention, the CPU sets an operation timing of the switching device based on the rotating condition of the ultrasonic motor.

In the drive circuit for the ultrasonic motor of the invention as structured above, the alternating current for driving the ultrasonic motor can be easily produced from the direct current. Moreover, the alternating current to be applied to the ultrasonic motor can be set to an optimum frequency by considering an external information and feeding back a rotation condition of the ultrasonic motor to thereby raise an efficiency of the ultrasonic motor.

Also, the drive circuit for the ultrasonic motor of the invention is provided with self-diagnosis functions for monitoring temperature rises of the switching device and the transformer, and a fault of the rotating condition of the ultrasonic motor to thereby improve the reliability of the drive circuit for the ultrasonic motor.

In an eleventh aspect of the invention, an ultrasonic motor includes a stator for generating a traveling wave by vibration when a motor apply voltage is supplied, and a rotor pressed onto the stator to form friction therewith. The rotor rotates by the friction with the stator due to the traveling wave. A drive circuit for the ultrasonic motor includes a voltage applying device for applying the motor apply voltage to the ultrasonic motor and controlled by timing pulses, and a vibration attenuating device connected to the voltage apply device. The vibration attenuating device is operated when the ultrasonic motor is stopped, so that the vibration of the stator of the ultrasonic motor is gradually reduced.

In a twelfth aspect of the invention, the vibration attenuating device includes a relay for connecting and disconnecting a line between the transformer and the DC power source, and a capacitor situated in the line between the transformer and the relay.

In a thirteenth aspect of the invention, the vibration attenuating device is formed of frequency changing means installed in the CPU. The frequency changing means sets the motor apply voltage to be applied to the ultrasonic motor to a high frequency voltage at the time of driving the ultrasonic motor, and stops the motor apply voltage after setting the voltage to a low frequency voltage at the time of stopping the ultrasonic motor.

In a fourteenth aspect of the invention, the frequency changing means sets a timing pulse at a short cycle at the time of driving the ultrasonic motor and at a long cycle longer than the short cycle at the time of stopping the ultrasonic motor. Thus, the motor apply voltage is set to the high frequency voltage at the time of driving and to the lower frequency voltage at the time of stopping.

When the ultrasonic motor in the driving condition is stopped, the ultrasonic motor is stopped after the vibration of the stator is attenuated by the vibration attenuating device. Therefore, the rotor gradually comes close to the stator by the pressure and slowly contacts the stator, so that there is generated almost no noise when the rotor contacts the stator. Accordingly, the stopping noise conventionally generated when the ultrasonic motor is stopped is prevented, and the ultrasonic motor provides quietness in all the operation range.

Especially, in the twelfth aspect, the vibration attenuating device is formed of the relay and capacitor, as a hardware. When the ultrasonic motor is stopped, the relay is shut off to thereby shut off the line between the DC power source and the transformer, so that the DC power is not supplied to the transformer. At this time, electric power charged into the capacitor constitutes the motor apply voltage. Since the voltage in the capacitor attenuates along the electric discharge curvature, the motor apply voltage is gradually lowered to finally become zero. Thus, the driving of the ultrasonic motor is stopped. Since the motor apply voltage is not instantaneously shut off as in the conventional device, and is gradually reduced, the vibration of the stator is also reduced gradually.

In the thirteenth and fourteenth aspects, the vibration attenuating device is formed as a software by the frequency changing means in the CPU. In the frequency changing means, the motor apply voltage is set as the high frequency voltage at the time of driving the ultrasonic motor to vibrate the stator largely, and at the time of stopping the ultrasonic motor, the motor apply voltage is set once at the low frequency voltage to vibrate the stator small and then, the ultrasonic motor is stopped.

BRIEF DESCRIPTION OF THE DRAWINGS

FIG. 10($b$) is a diagram for showing output waveforms of switching elements $Q_1$, $Q_2$ in a switching element portion;

FIG. 10($c$) is a diagram for showing waveforms (output waveforms of transformers) of high frequency voltages $\Phi_0$, $\Phi_{90}$ to be applied to the ultrasonic motor;

FIG. 14($a$) is a side view showing a stator of a conventional ultrasonic motor;

FIG. 14($b$) is a plan view thereof;

FIG. 15 is a perspective view showing a driving condition of the stator;

DETAILED DESCRIPTION OF PREFERRED EMBODIMENTS

With reference to the accompanying drawings, embodiments according to the invention are explained hereunder.

Figure 1:
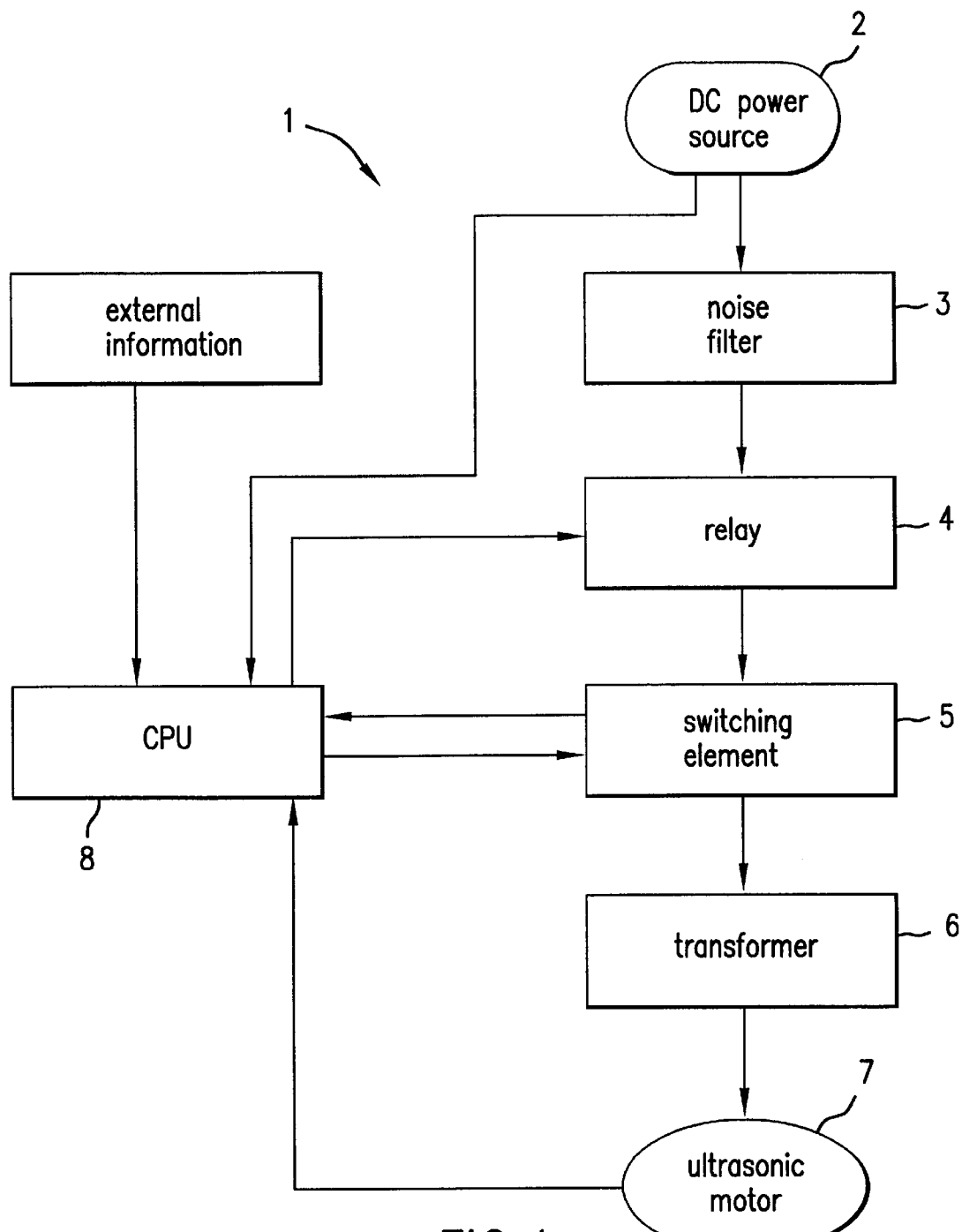
FIG. 1 is a block diagram showing a first embodiment of a drive circuit for an ultrasonic motor according to the present invention.
Figure 2:
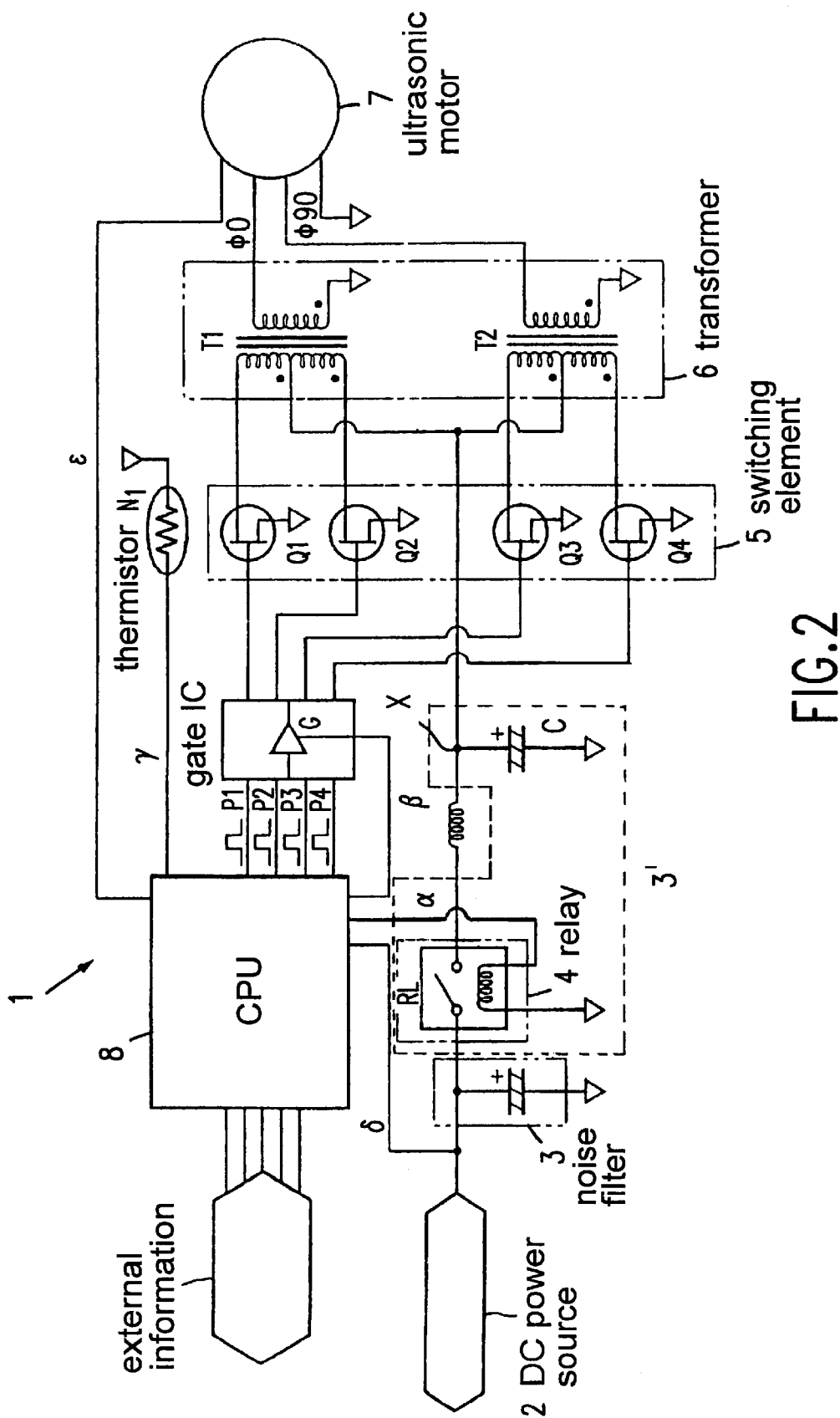
FIG. 2 is an electric circuit diagram of the drive circuit for the ultrasonic motor shown in FIG. 1.

FIG. 1 is a block diagram for showing a first embodiment of a drive circuit for an ultrasonic motor of the present invention, and FIG. 2 is an electric circuit diagram thereof.

In the drive circuit for the ultrasonic motor of the first embodiment, alternate currents of two phase high frequency voltage having a phase difference of 90° or −90° can be produced from a direct current of a low voltage. The drive circuit for this purpose will be explained hereunder.

As shown in FIG. 2, the drive circuit 1 for the ultrasonic motor includes a DC power source (hereinafter referred to as DC power sources) 2 for generating a low voltage direct current; a noise filter 3; a relay portion 4 for supplying the direct current from the DC power source 2 and interrupting the direct current; a vibration attenuating device 3' formed of the relay portion 4 and a capacitor C connected to the relay portion 4; a switching element portion 5 for controlling supply of the direct current from the DC power source 2 at a predetermined timing pulse; a transformer or transforming portion 6 for generating alternating currents of two phase high frequency voltage having a phase difference of 90°, which have been raised from the low voltage direct current and controlled by the switching element portion 5, and supplying the alternating currents to the ultrasonic motor 7; and a central processing unit (hereinafter referred to as CPU) 8 for controlling the relay portion 4 and the switching element portion 5 so that a frequencies of the alternating currents generated at the transforming portion 6 become optimum, based on a signal from an external information, such as a load of the ultrasonic motor 7, a monitoring signal obtained by monitoring of a condition of a power source voltage of the DC power source 2, and respective feedback signals from the switching element portion 5 and the ultrasonic motor 7.

With reference to an electric circuit diagram shown in FIG. 2, there is described a method for generating the alternating currents of the two phase high frequency voltage having the phase difference of 90° from the low voltage direct current in the drive circuit 1 of the ultrasonic motor.

First, the CPU 8 outputs a control signal α to the relay portion 4 to close a relay RL thereof. Then, a DC power is supplied to centers of primary windings of two transformers $T_1$, $T_2$ from the DC power source 2, and the capacitor C is charged. Also, the CPU 8 sets a gate IC in a conductive state of a timing pulse signal therefrom by providing a gate signal β to the gate IC.

Figure 3:
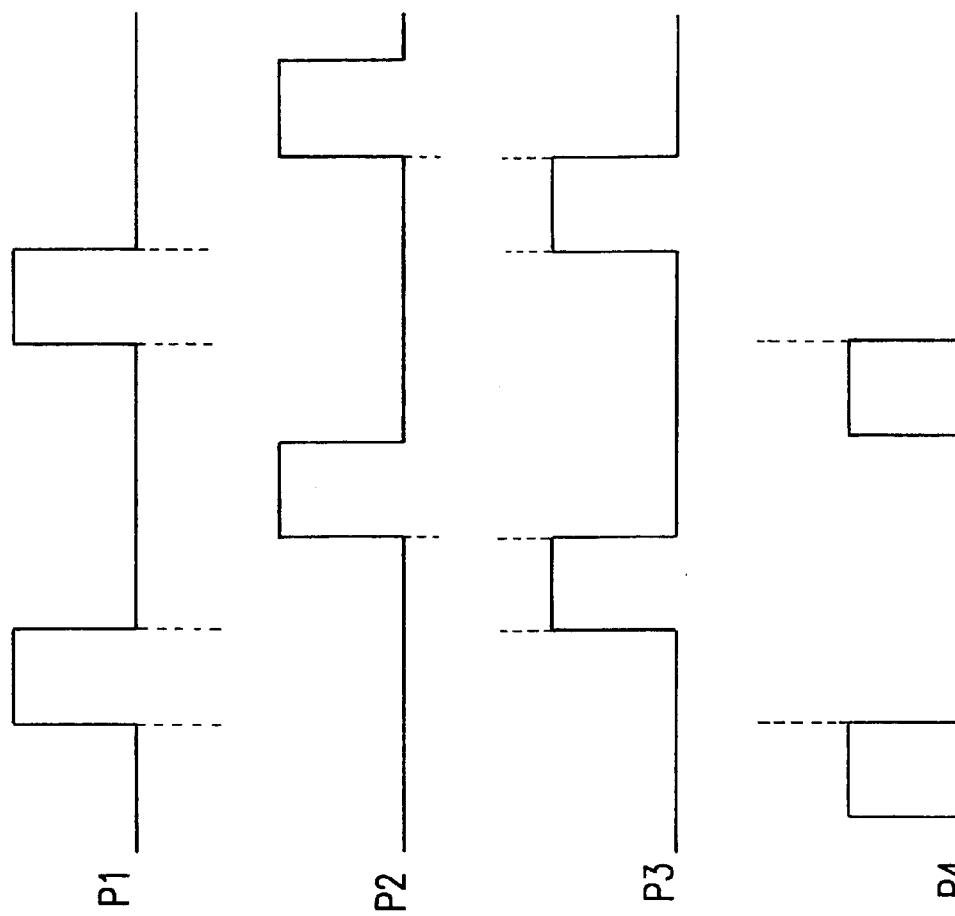
FIG. 3 is a diagram showing timing pulses of the first and second embodiments shown in FIGS. 1 and 5.

Further, the CPU 8 obtains timing pulses $P_1$, $P_2$, $P_3$, $P_4$ of four layer clock pulses for driving the ultrasonic motor 7 as shown in FIG. 3, based on a signal γ of a temperature information detected by a thermistor $N_1$ attached to a radiation fin (not shown) of two switching elements $Q_1$, $Q_2$ connected to both ends of the primary winding of a transformer T1 and two switching elements $Q_3$, $Q_4$ connected to both ends of the primary winding of a transformer $T_2$, at the switching element portion 5, a monitoring information signal δ of a power source voltage, and the external information; and outputs the timing pulses $P_1$, $P_2$, $P_3$, $P_4$ to the switching elements $Q_1$, $Q_2$, $Q_3$, $Q_4$, respectively. The timing pulses $P_1$, $P_2$, $P_3$, $P_4$ shown in FIG. 3 are outputted in the order of $P_1 \to P_2 \to P_3 \to P_4$.

Thus, the respective switching elements $Q_1$, $Q_2$, $Q_3$, $Q_4$ allow the DC current of the DC power source to flow through the respective primary wirings of the transformers $T_1$, $T_2$ according to the timing pulses $P_1$, $P_2$, $P_3$, $P_4$. Therefore, an alternating current $\Phi_0$ of a raised high frequency voltage is generated on a secondary wiring side of the transformer $T_1$, and at the same time, an alternating current $\Phi_{9O}$ of a raised high frequency voltage is generated on a secondary wiring side of the transformer $T_2$. At this time, a phase difference between the generated two alternating currents $\Phi_0$ and $\Phi_{90}$ becomes 90° according to the timing pulses $P_1$, $P_2$, $P_3$, $P_4$ as shown in FIG. 3. Thus, alternating currents of two phase high frequency voltage having the phase difference of 90° can be produced from the direct current. Then, the thus obtained two phase alternating currents are applied to the ultrasonic motor 7 to operate the same. At this time, an information signal E of a rotating condition, i.e. rotating number, is fed back to the CPU 8.

Then, the CPU 8 obtains an optimum AC waveform for driving the ultrasonic motor 7 based on the external information and the rotating condition of the ultrasonic motor 7, and sets the timing pulses $P_1$, $P_2$, $P_3$, $P_4$ to become the obtained AC waveform.

As explained hereinabove, according to the drive circuit 1 of the first embodiment, since alternating currents to be applied to the ultrasonic motor 7 can be held at the optimum frequency, efficiency of the ultrasonic motor can be raised. Moreover, according to the drive circuit 1, the alternating currents can be easily produced from the direct current.

Incidentally, in case the ultrasonic motor 7 is operated by the alternating currents thus produced from the direct current, since a sine wave is supplied to the ultrasonic motor 7, a parallel resonance takes place due to a condenser component of the ultrasonic motor 7 and inductance components on the secondary sides of the transformers $T_1$, $T_2$. However, when the ultrasonic motor 7 is operated for a long time, large quantities of the power source currents flow through the switching elements $Q_1$, $Q_2$, $Q_3$, $Q_4$ due to change of the resonance frequency of the parallel resonance, and the respective switching elements $Q_1$, $Q_2$, $Q_3$, $Q_4$ start generating heat.

Then, the heat generation of the switching elements $Q_1$, $Q_2$, $Q_3$, $Q_4$ is monitored by the thermistor $N_1$, and when a temperature detected by the thermistor $N_1$ becomes higher than a predetermined temperature, the CPU 8 terminates outputs of the timing pulses $P_1$, $P_2$, $P_3$, $P_4$ and also terminates output of a gate signal to the gate IC to thereby stop the ultrasonic motor 7. As described above, with a double stopping method of the ultrasonic motor, the ultrasonic motor 7 is reliably stopped at the time of raised high temperatures of the switching elements $Q_1$, $Q_2$, $Q_3$, $Q_4$.

Figure 4:
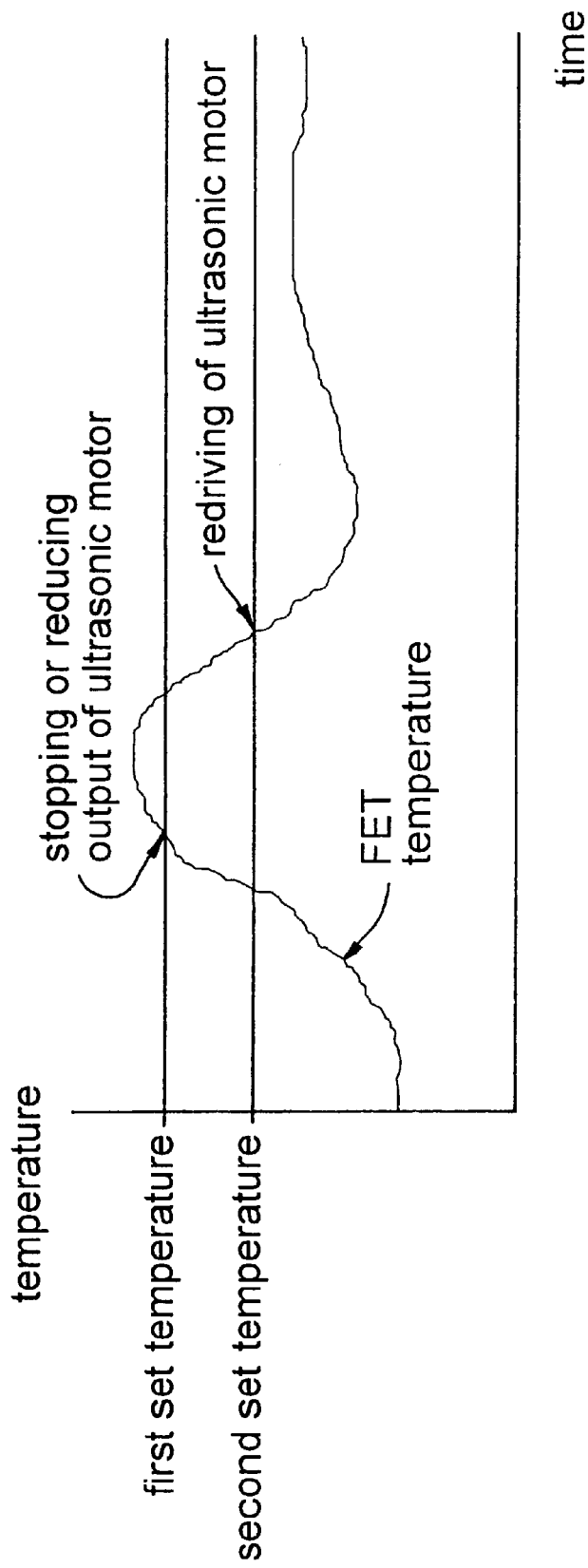
FIG. 4 is a graph for controlling the ultrasonic motor according to a temperature information in the embodiments shown in FIGS. 1 and 5.

Incidentally, when the temperature detected by the thermistor $N_1$ becomes higher than a predetermined temperature, the currents to be applied to the ultrasonic motor 7 by the transformers $T_1$, $T_2$ may be decreased. Also, a comparison reference temperature of a first set temperature and a second set temperature lower than the first set temperature as shown in FIG. 4 is set, and when the temperature detected by the thermistor $N_1$ becomes higher than the first set temperature, the ultrasonic motor 7 is stopped, or an output of the ultrasonic motor 7 is reduced to a value lower than a predetermined output. When the temperature detected by the thermistor $N_1$ becomes lower than the second set temperature, the ultrasonic motor 7 may be re-driven at an output larger than a predetermined output to thereby provide hysteresis to driving control of the ultrasonic motor 7.

Further, through feed back of the information signal of the rotating condition of the ultrasonic motor 7 to the CPU 8, also, when the CPU 8 detects a fault of the rotating condition of the ultrasonic motor 7, the ultrasonic motor 7 is stopped by the double stopping method as described above.

As described hereinabove, since the drive circuit 1 of the ultrasonic motor 7 of the first embodiment is provided with a self-diagnosis function, when the temperature is abnormally raised or the rotating condition of the ultrasonic motor 7 becomes abnormal, the ultrasonic motor 7 can be positively stopped by the double stopping method to thereby increase its reliability.

Figure 5:
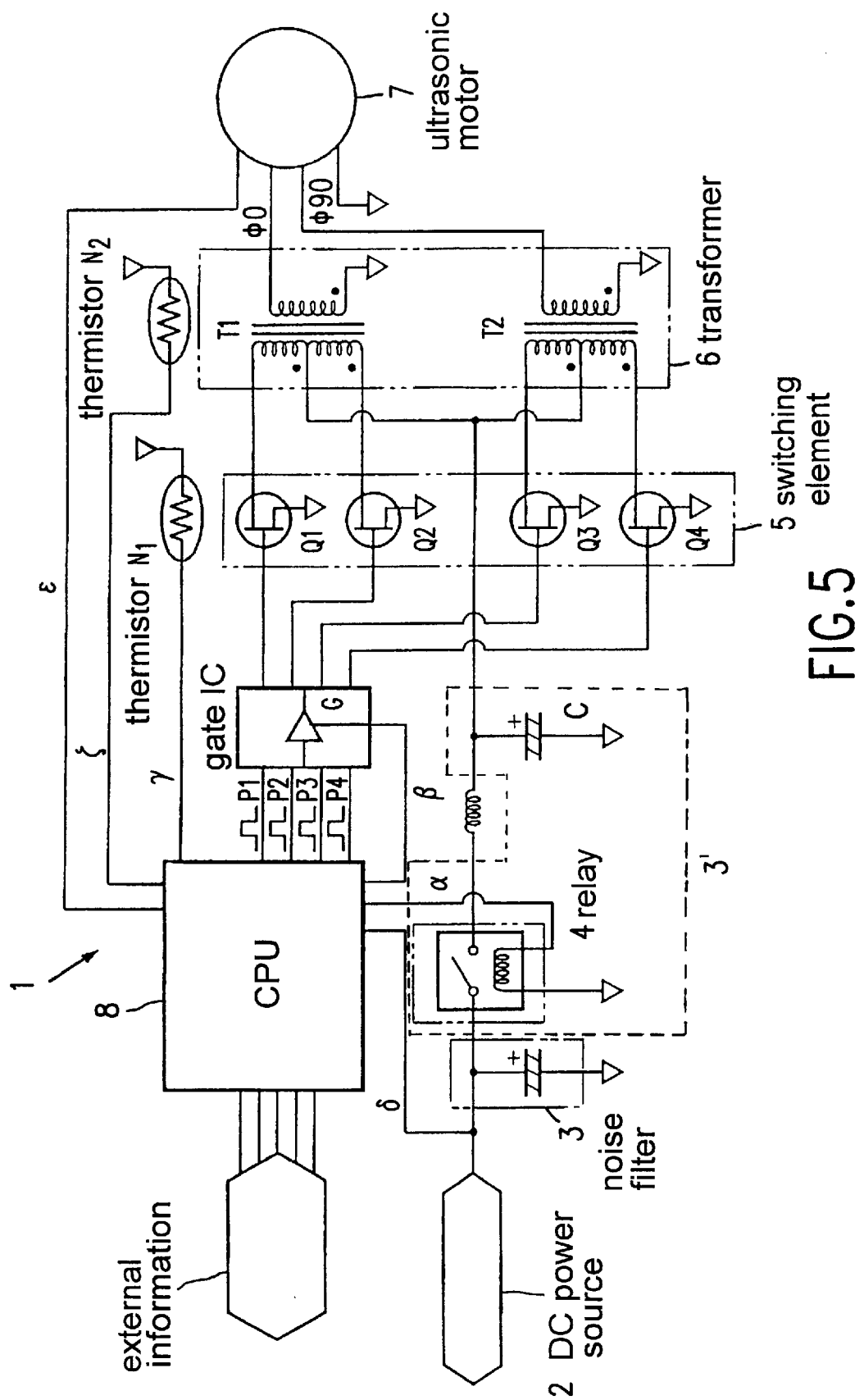
FIG. 5 is an electric circuit diagram, similar to FIG. 2, of a drive circuit for an ultrasonic motor of a second embodiment of the invention.

FIG. 5 is an electric circuit diagram, similar to FIG. 2, of a drive circuit for an ultrasonic motor of a second embodiment of the present invention. Incidentally, the same constituting elements as those in the drive circuit of the first embodiment are shown with the same reference symbols, and explanations thereof are omitted.

Figure 6:
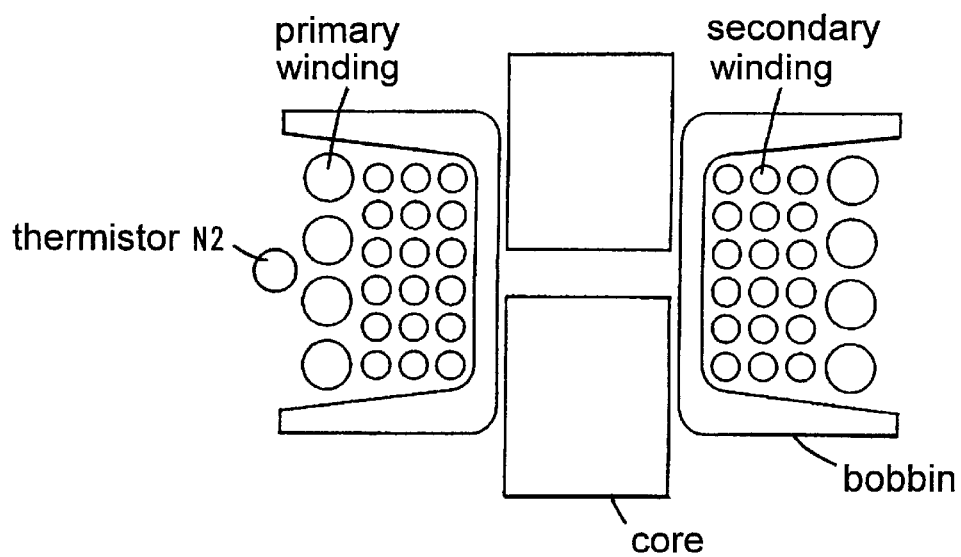
FIG. 6 is a diagram for showing a position where a thermistor is attached.

As described above, when the ultrasonic motor 7 is driven, although the parallel resonance takes place, in case a resonance condition of the parallel resonance is destroyed or the ultrasonic motor 7 is driven for a long time, the windings of the transformers $T_1$, $T_2$ also generate heat due to copper loss. Therefore, in the drive circuit of the second embodiment, in addition to the drive circuit 1 of the first embodiment, as shown in FIG. 5, the heat generations of the transformers $T_1$, $T_2$ are monitored by a thermistor $N_2$, and a temperature information signal ζ detected by the thermistor $N_2$ is inputted to the CPU 8. When the temperatures of the transformers $T_1$, $T_2$ become higher than a predetermined value, the CPU 8 stops the outputs of the timing pulses $P_1$, $P_2$, $P_3$, $P_4$ to thereby terminate the drive of the ultrasonic motor 7, or the electric currents to be applied to the ultrasonic motor 7 are reduced by the transformers $T_1$, $T_2$ to thereby lower an output of the ultrasonic motor 7 than a predetermined output. In that case, the thermistor $N_2$ is provided to the wiring portion on the primary side where a great heat generation takes place, as shown in FIG. 6.

With termination of the outputs of the timing pulses $P_1$, $P_2$, $P_3$, $P_4$, since the switching elements $Q_1$, $Q_2$, $Q_3$, $Q_4$ do not operate, the electric current is not applied to the transformers $T_1$, $T_2$ to thereby terminate their operations. Thus, the transformers $T_1$, $T_2$ are protected. Also, since the outputs of the transformers $T_1$, $T_2$ are lowered by decreasing the electric currents to be applied to the ultrasonic motor 7, heat generations of the transformers $T_1$, $T_2$ are suppressed. Thus, the transformers $T_1$, $T_2$ are protected, as well.

As described hereinabove, the drive circuit 1 of the ultrasonic motor 7 according to the second embodiment stops operations of the transformers $T_1$, $T_2$ or reduces the outputs of the transformers $T_1$, $T_2$ when the temperatures of the transformers $T_1$, $T_2$ are abnormally raised so that the heat generation of the transformers $T_1$, $T_2$ is suppressed. Thus, the reliability of the drive circuit 1 can be further improved.

Incidentally, when the temperatures of the transformers $T_1$, $T_2$ are abnormally raised, the ultrasonic motor 7 can also have the hysteresis in its driving control as in the case of the first embodiment shown in FIG. 4. The other structures, functions and effects in the drive circuit of the ultrasonic motor of the second embodiment are the same as those of the first embodiment.

Figure 7:
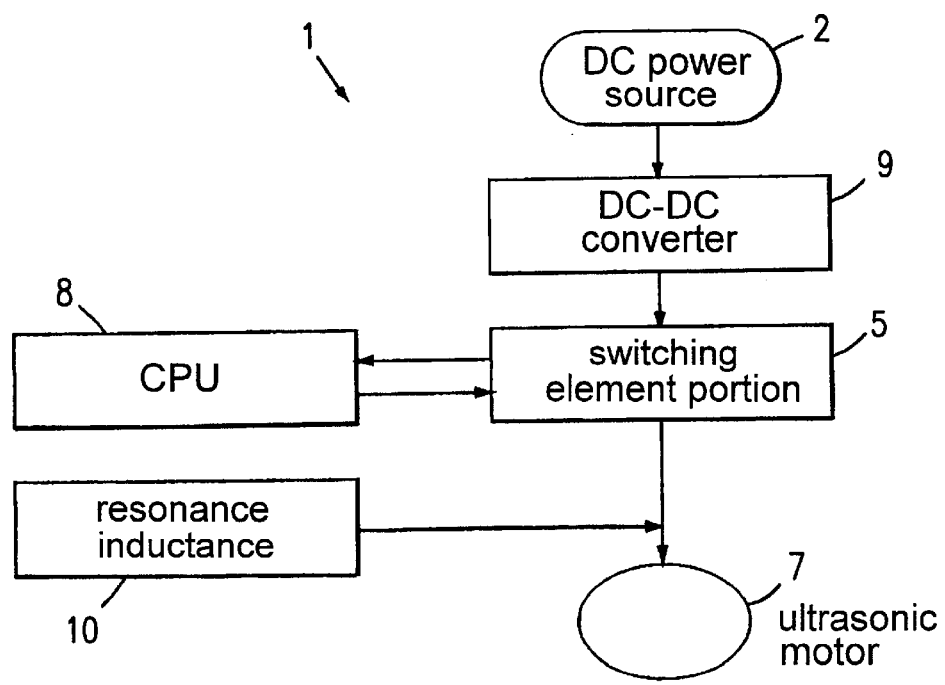
FIG. 7 is a block diagram for showing a third embodiment of the invention.
Figure 8:
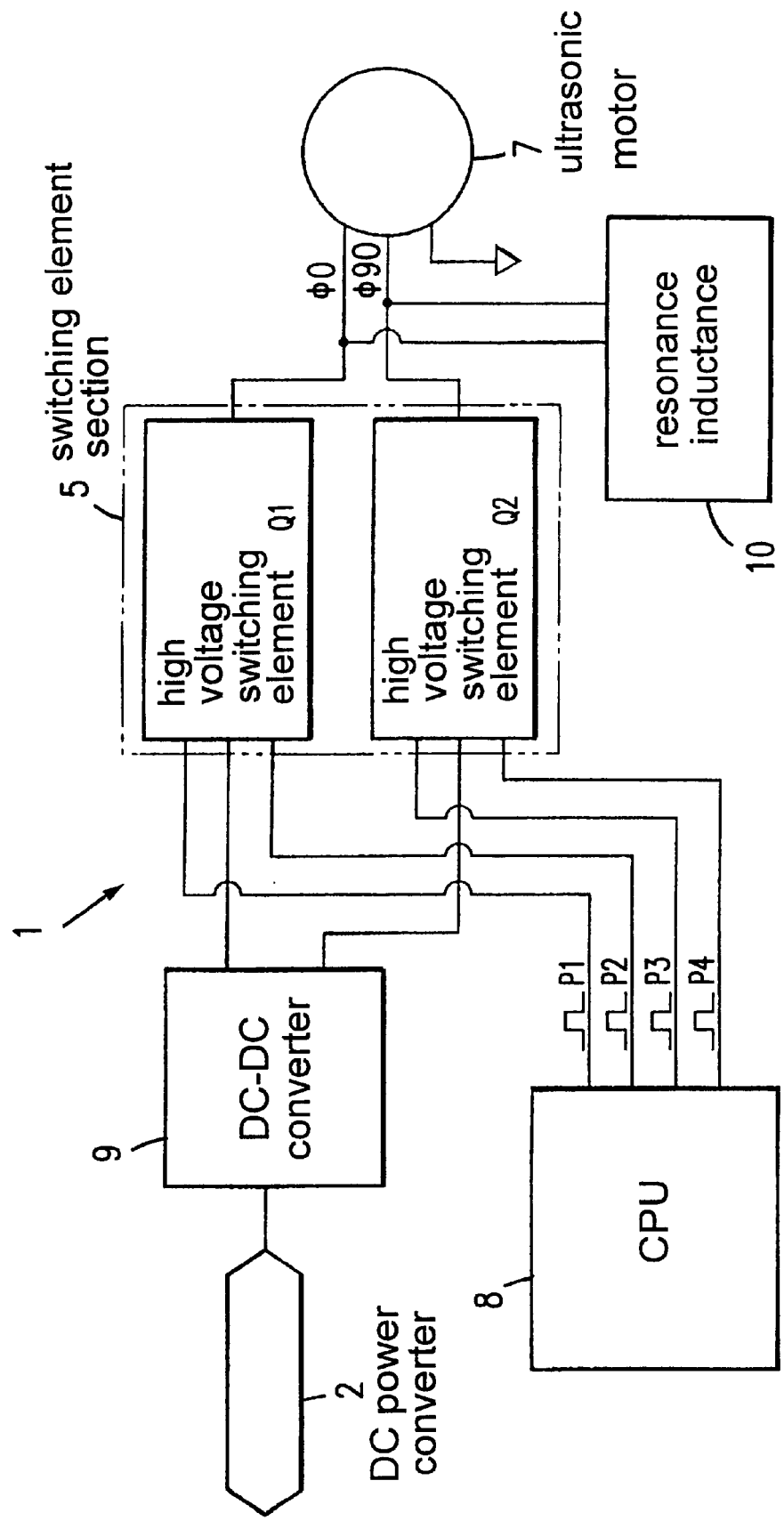
FIG. 8 is an electric circuit diagram of the third embodiment shown in FIG. 7.

FIG. 7 is a block diagram showing a drive circuit of an ultrasonic motor of a third embodiment of the present invention. FIG. 8 is an electric circuit diagram of the third embodiment shown in FIG. 7. Incidentally, the same constituting elements in the drive circuit as those in the first and second embodiments are shown with the same reference symbols, and detailed explanations thereof are omitted In the first and second embodiments, the alternate currents $\Phi_0$, $\Phi_{90}$ are generated by flowing the direct current through the transformers $T_1$, $T_2$ while switching the direct current by the switching element portion 5. However, in the drive circuit 1 of the ultrasonic motor of the third embodiment, the direct current from the DC power source is converted into DC high voltages with a plus electric potential and a minus electric potential, and these DC high voltages are applied to the ultrasonic motor 7 while switching by timing pulses. In this case, since an output waveform of the DC high voltage through the switching becomes a square wave, the square wave is converted into a sine wave to be applied to the ultrasonic motor 7.

More specifically, as shown in FIG. 7, the drive circuit 1 of the ultrasonic motor according to the third embodiment includes a DC power source 2; a DC-DC converter 9 for converting the direction current from the DC power source into the DC high voltages with the plus electric potential and minus electric potential; a switching element portion 5 for outputting these DC high voltages to the ultrasonic rotor 7 while switching; a CPU 8 for outputting the timing pulses to control the switching element portion 5; and a resonance inductance 10 for transforming a square wave into a sine wave.

With reference to an electric circuit diagram shown in FIG. 8, there is explained a method for generating high frequency voltage alternating currents of two phases with a phase difference of 90° from a low voltage direct current in the drive circuit 1 of the ultrasonic motor of the third embodiment.

First, when a low voltage direct current is supplied to the DC-DC converter 9 from the DC power source 2, the DC-DC converter 9 converts the supplied direct current into DC high voltages with the plus electric potential and the minus electric potential to output. In this case, the DC high voltage with the plus electric potential is supplied to a high voltage switching element $Q_1$ of the switching element portion 5, and the DC high voltage with the minus electric potential is supplied to a high voltage switching element $Q_2$.

Then, the CPU 8 outputs predetermined timing pulses $P_1$, $P_2$, $P_3$, $P_4$ to the witching element portion 5, and the respective high voltage switching elements $Q_1$, $Q_2$ are switched according to these timing pulses $P_1$, $P_2$, $P_3$, $P_4$. These timing pulses $P_1$, $P_2$, $P_3$, $P_4$ may be set in the same manner as those in the previous embodiments, or may be suitably set by other methods. Thus, a high frequency voltage $\Phi_0$ is outputted from the high voltage switching element $Q_1$, and at the same time, a high frequency voltage $\Phi_{90}$ with a timewise phase difference by 90° from the high frequency voltage $\Phi_0$ is outputted from the high voltage switching element $Q_2$. At this time, the high frequency voltages $\Phi_0$, $\Phi_{90}$ from the respective high voltage switching elements $Q_1$, $Q_2$ have square waves. Since the ultrasonic motor 7 can not be driven smoothly by the square waves, these square waves are transformed into sine waves by a resonance inductance 10 and then supplied to the ultrasonic motor 7 to thereby smoothly drive the same.

The other functions and effects of the drive circuit 1 of the ultrasonic motor of the third embodiment are the same as those of the previous embodiments.

Figure 9:
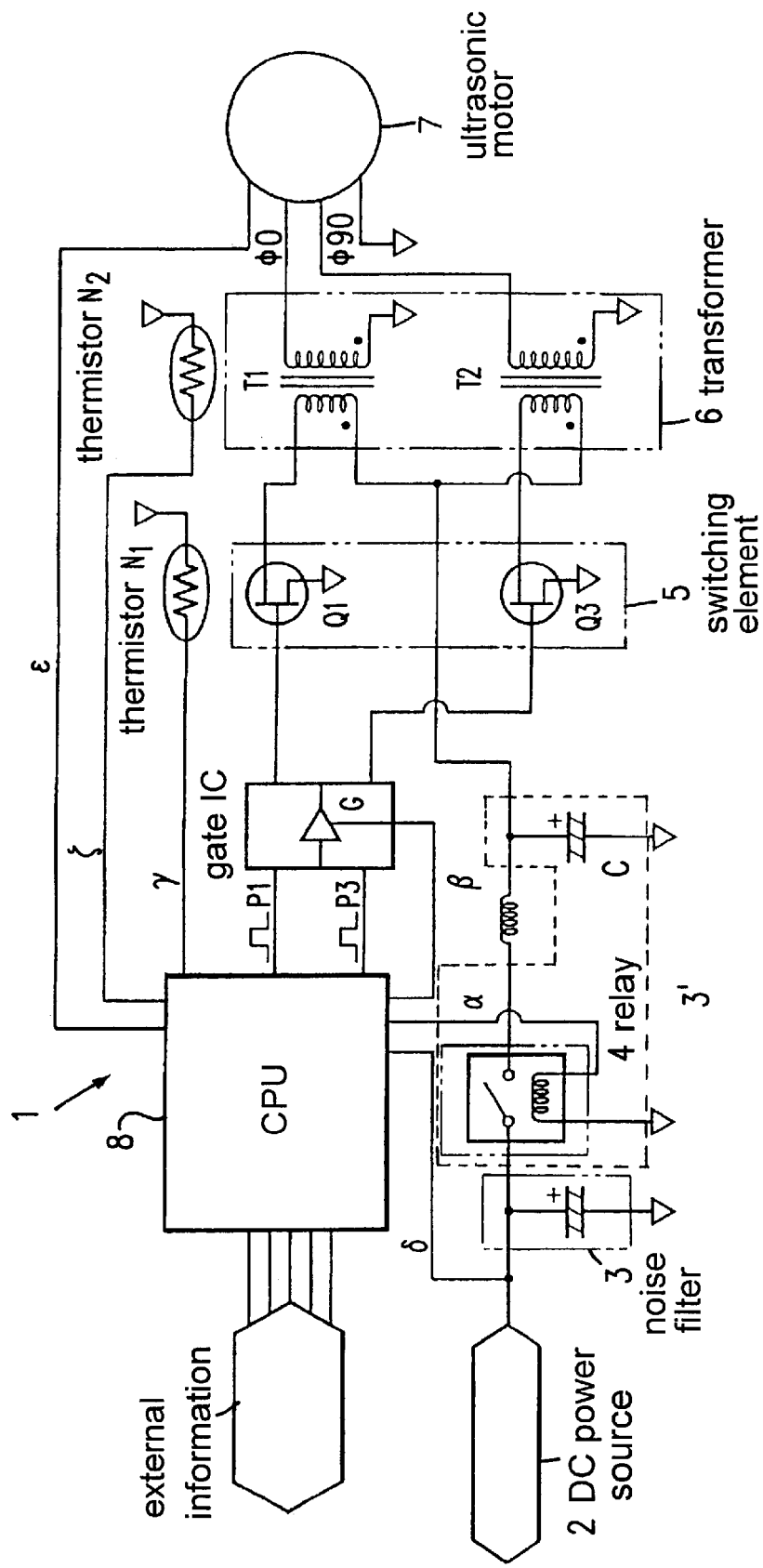
FIG. 9 is an electric circuit diagram, similar to FIG. 5, of a fourth embodiment of the invention.

FIG. 9 is an electric circuit diagram, similar to FIG. 5, of a drive circuit of an ultrasonic motor of a fourth embodiment of the invention. Incidentally, the same constituting elements as those of the previous embodiments are shown with the same reference symbols, and the explanation therefore are omitted.

Figure 10A:
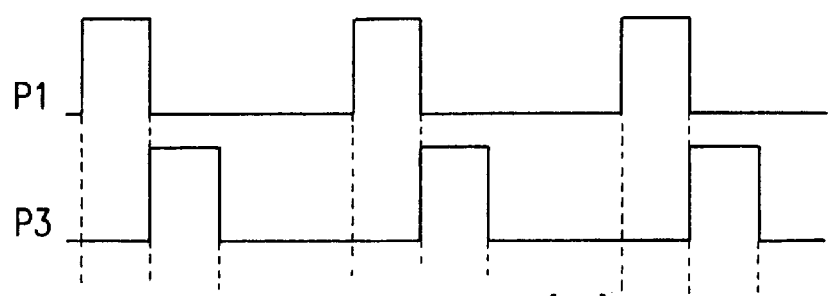
FIG. 10($a$) is a diagram for showing timing pulses in the electric circuit of the fourth embodiment shown in FIG. 9.

In the second embodiment as shown in FIG. 5, four switching elements $Q_1$, $Q_2$, $Q_3$, $Q_4$ are used in the switching element portion 5, and the primary side coils of the respective transformers $T_1$, $T_2$ in the transforming portion 6 are provided to the respective switching elements $Q_1$, $Q_2$, $Q_3$, $Q_4$. Further, the four phase clock pulses including four timing pulses $P_1$, $P_2$, $P_3$, $P_4$ are outputted from the CPU 8. However, in the fourth embodiment shown in FIG. 9, the two switching elements $Q_2$, $Q_4$ in the switching element portion 5 are omitted; the remaining two switching elements $Q_1$, $Q_3$ are used; the primary side coils of the respective transformers $T_1$, $T_2$ are provided to the both switching elements $Q_1$, $Q_3$; and as shown in FIG. 10(a), two phase clock pulses including the two timing pulses $P_1$, $P_3$, among four timing pulses shown in FIG. 3, corresponding to the switching elements $Q_1$, $Q_3$ are outputted from the CPU 8.

Figure 10B:
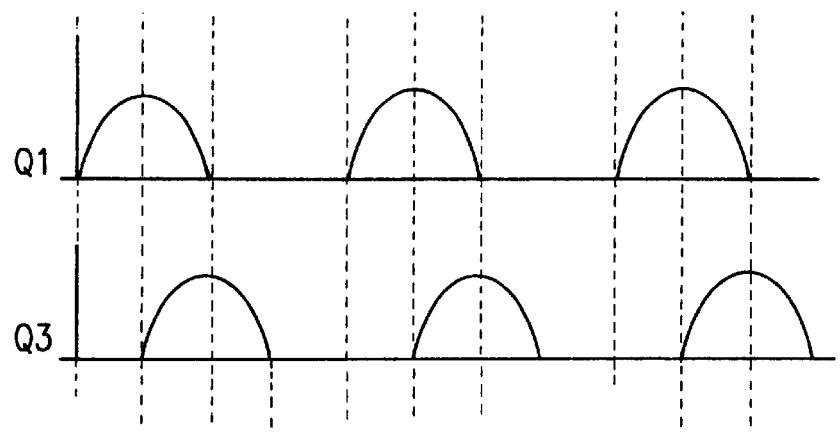

Then, the output of the switching element $Q_1$, as shown in FIG. 10(b), becomes only upper side portions of the sine wave by one timing pulse $P_1$ out of the timing pulses $P_1$, $P_3$. In the same manner, the output of the switching element $Q_3$, as shown in FIG. 10(b), becomes only upper side portions of the sine wave by the other timing pulse $P_3$. The outputs of these switching elements $Q_1$, $Q_3$ are shifted by ¼ wavelength (γ) in phase, i.e. 90° each other.

The other structures of the drive circuit of the ultrasonic motor of the fourth embodiment are the same as those of the embodiment shown in FIG. 5.

Figure 10C:
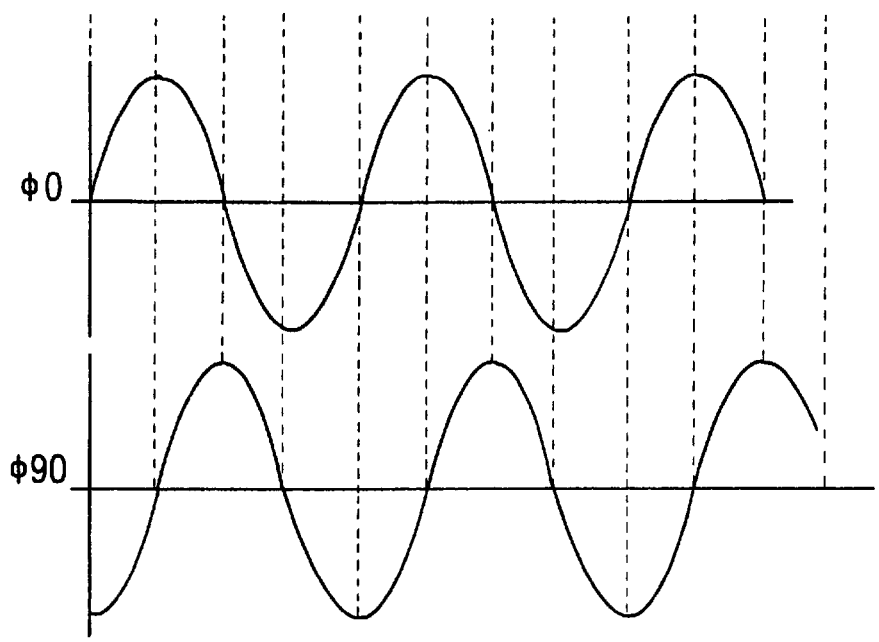

In the drive circuit 1 of the ultrasonic motor of the fourth embodiment thus structured, upon receipt of the output of the switching element $Q_1$, the transformer $T_1$ raises the voltage of the output of the switching element $Q_1$ and outputs. At this time, the lower portions, i.e. minus side portions, of the sine wave of the output of the switching element $Q_1$ are missing as shown in FIG. 10(b), where the switching element $Q_1$ does not output. However, even in these lower portions, i.e. minus side portions, where the switching element $Q_1$ does not output, the lower portions of the sine wave are outputted as shown in FIG. 10(c) by a flyback effect on the secondary side of the transformer $T_1$ and a resonance effect by a load based on a capacity C of an inductance L on the secondary side of the transformer $T_1$ and the ultrasonic motor 7. Finally, the high frequency voltage $\Phi_0$ supplied from the transformer $T_1$ to the ultrasonic motor 7 becomes a full sine waveform. In the same manner, the high frequency voltage $\Phi_{90}$ supplied from the transformer $T_2$ to the ultrasonic motor 7 also becomes a full sine waveform. In this case, the high frequency voltage $\Phi_{90}$ is shifted with respect to the high frequency voltage $\Phi_0$ by ¼ wavelength (γ), i.e. 90° in the phase.

According to the drive circuit 1 of the ultrasonic motor 7 of the fourth embodiment, when compared with the second embodiment shown in FIG. 5, two switching elements are reduced to thereby decrease the number of parts, and the inner circuit of the transformer is reduced so that the transformer can be easily manufactured. Moreover, since two timing pulses outputted by the CPU 8 are reduced to be two phase clock pulses, control thereof becomes easy, so that the program process becomes simple to thereby lower the level of the CPU 8. Thus, the cost of the drive circuit 1 can be decreased, and at the same time a substrate of the CPU 8 can be miniaturized.

The other functions and effects of the drive circuit of the ultrasonic motor of the fourth embodiment are the same as those of the second embodiment shown in FIG. 5.

Figure 11:
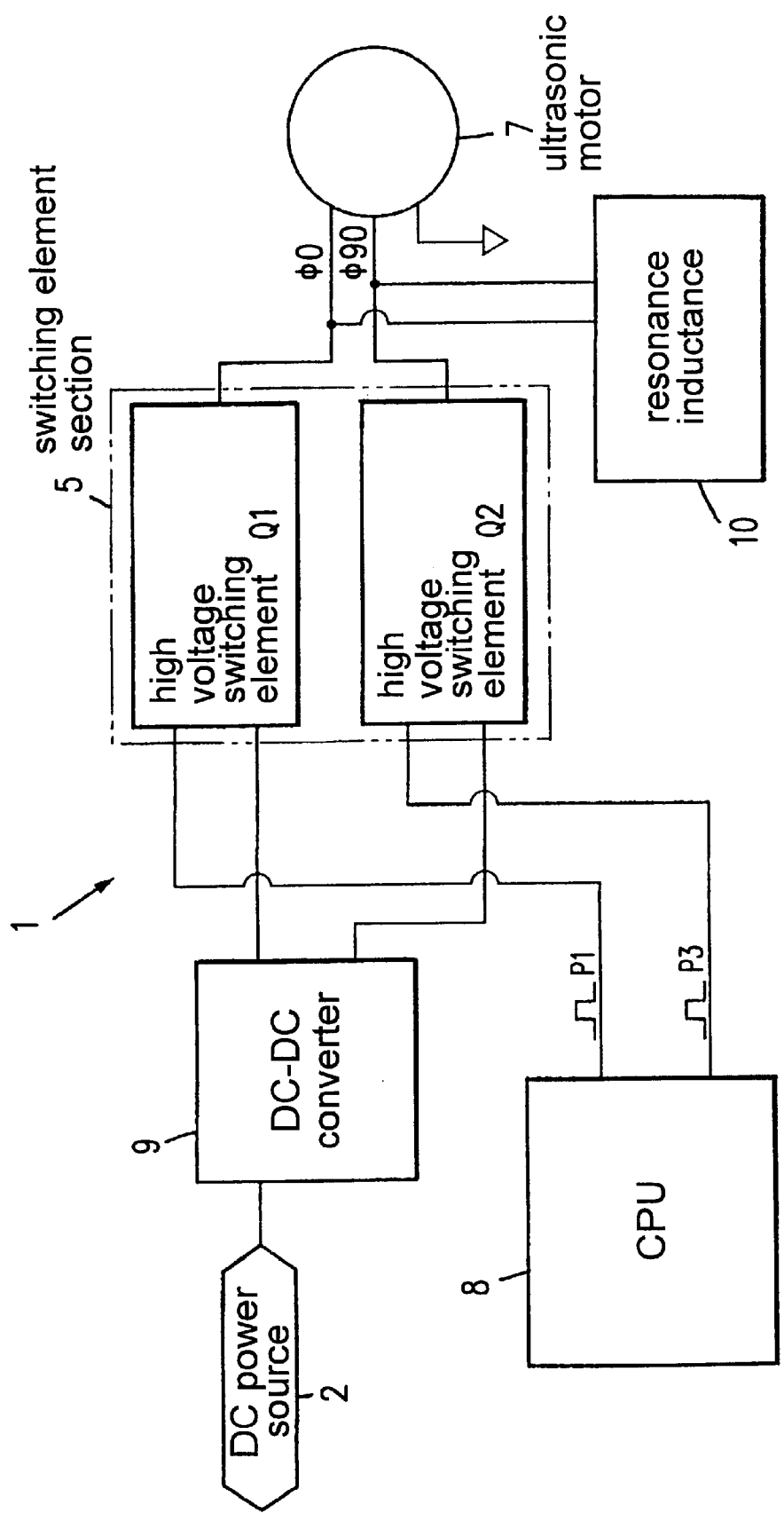
FIG. 11 is an electric circuit diagram, similar to FIG. 8, of a fifth embodiment of the invention.

FIG. 11 is an electric circuit diagram, similar to FIG. 8, of a drive circuit of an ultrasonic motor of a fifth embodiment according to the invention. Incidentally, the same constituting elements as those of the previous embodiments are shown with the same reference symbols, and the explanations therefore are omitted.

In the third embodiment shown in FIG. 8, two high voltage switching elements $Q_1$ and $Q_2$ in the switching element portion 5 are controlled by two timing pulses $P_1$, $P_2$ and $P_3$, $P_4$, respectively. However, in the drive circuit 1 of the present embodiment, as shown in FIG. 11, high voltage switching elements $Q_1$ and $Q_2$ are controlled by timing pulses $P_1$ and $P_3$, respectively. The timing pulses $P_1$ and $P_3$ at this time are the same as those shown in FIG. 10(a). The other structures of the drive circuit of the ultrasonic motor of the fifth embodiment are the same as those of the third embodiment as shown in FIG. 8.

A high frequency voltage $\Phi_0$ outputted from the high voltage switching element $Q_1$ and a high frequency voltage $\Phi_{90}$ outputted from the high voltage switching element $Q_2$ are transformed into full sine waves by a flyback effect of a resonance inductance 10 and a resonance effect by a load based on capacities C of the resonance inductance 10 and the ultrasonic motor 7, and supplied to the ultrasonic motor 7. Thus, the ultrasonic motor 7 can be smoothly driven.

According to the drive circuit 1 of the ultrasonic motor 7 of the fifth embodiment, since the timing pulses outputted by the CPU 8 are reduced by two when compared with that of the third embodiment shown in FIG. 8 so as to be two phase clock pulses, control can be done easily and a programming process can be simple to thereby lower the level of the CPU 8. Thus, a cost of the drive circuit 1 can be reduced, and at the same time a substrate of the CPU 8 can be miniaturized.

The other operations and effects of the drive circuit 1 of the ultrasonic motor of the present embodiment are the same as those of the third embodiment shown in FIG. 8.

The operation when the ultrasonic motor is stopped is explained below with reference to FIG. 2.

Figure 12:
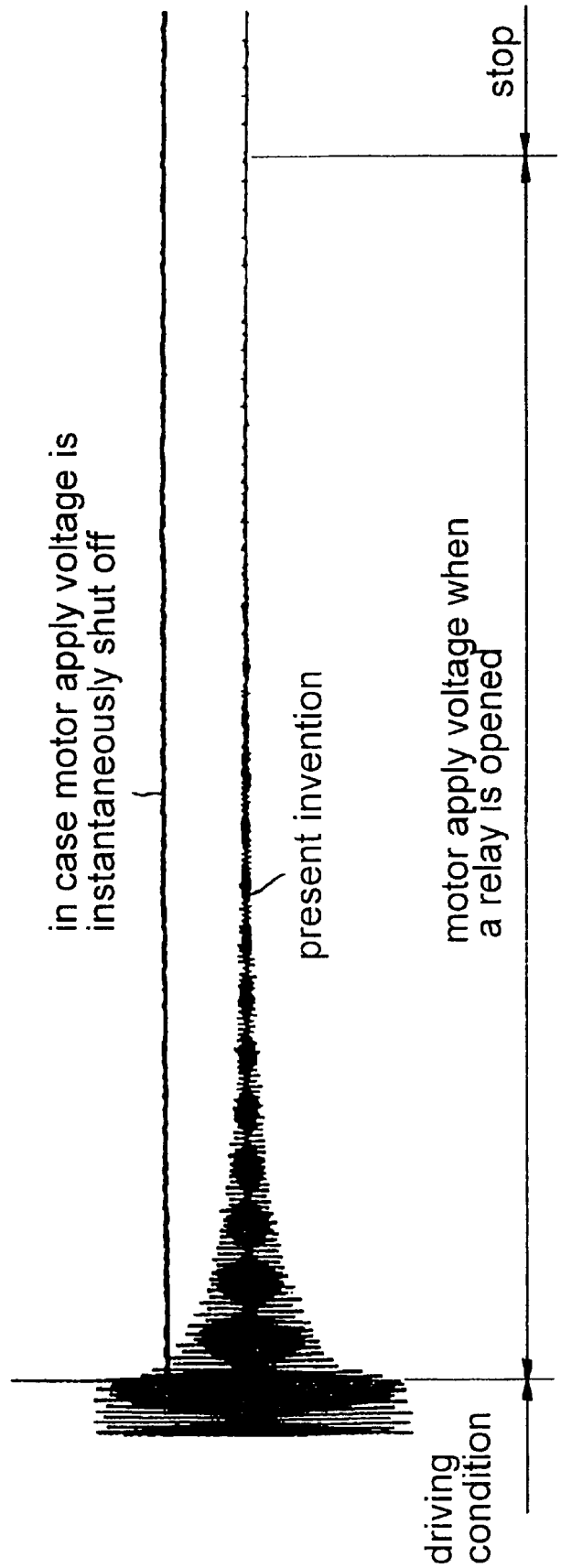
FIG. 12 is a graph for showing an attenuating process of a motor apply voltage at the time of stopping the ultrasonic motor in the drive circuit of the ultrasonic motor shown in FIG. 2.

In order to stop driving of the ultrasonic motor 7, the CPU opens the relay RL. As a result, since the transformer 6 is shut off from the DC power supply 2, the transformer 6 forms the motor apply voltages $\Phi_0$, $\Phi_{90}$ to be applied to the ultrasonic motor 7 by the electric power charged in the capacitor C, which are supplied to the ultrasonic motor 7. At this time, since the voltage at a point X at one side of the capacitor C is reduced along the known discharging curve, the motor apply voltages $\Phi_0$, $\Phi_{90}$ are lowered gradually as shown in FIG. 12 to finally become zero (0 V). As a result, the driving of the ultrasonic motor 7 is stopped.

Incidentally, for comparison, an example when the motor apply voltage is shut off instantaneously is shown.

As stated above, in the drive circuit for the ultrasonic motor 7, since the motor apply voltages $\Phi_0$, $\Phi_{90}$ applied to the ultrasonic motor 7 are gradually reduced by the vibration attenuating device 3', not shut off instantaneously as in the conventional case, the elliptical vibration of the stator S is gradually reduced, so that the traveling wave generated at the stator S is extinguished gradually. As a result, the rotor R gradually comes close to the stator S by the pressure of the spring H and contacts the stator S slowly. Thus, the noise generated when the rotor R contacts the stator S does not substantially occur. Namely, the stopping noise is prevented. Consequently, the ultrasonic motor can provide quietness in all the driving control range. Since the vibration attenuating device 3' is formed of the relay RL and the capacitor C as a hardware, the stopping noise is surely prevented.

Figure 13:
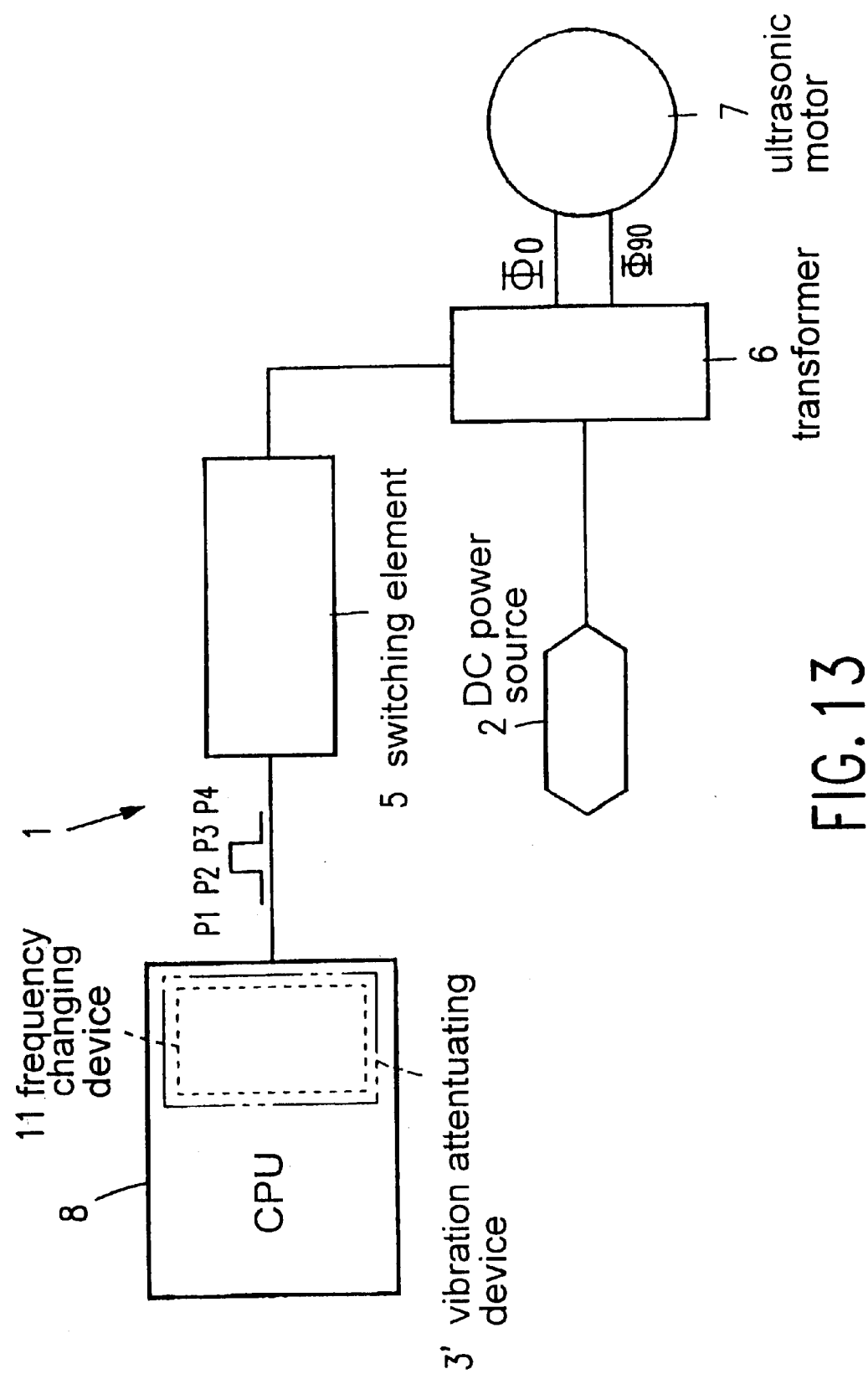
FIG. 13 is a block diagram showing another example of the invention.
Figure 16:
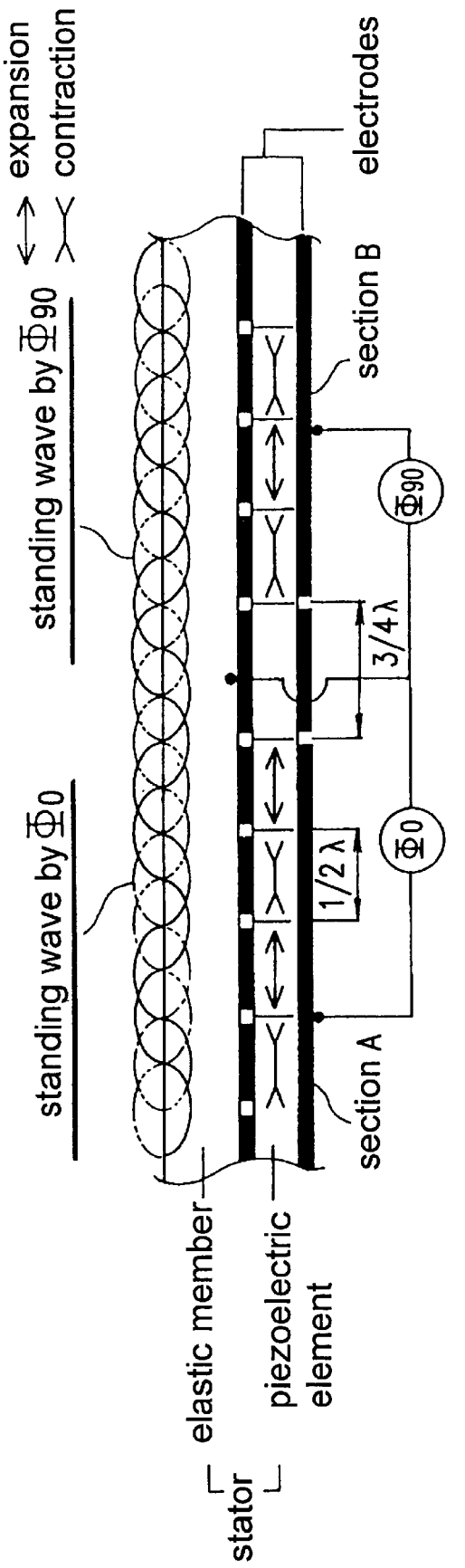
FIG. 16 is a diagram for explaining a driving method of the stator.
Figure 17:
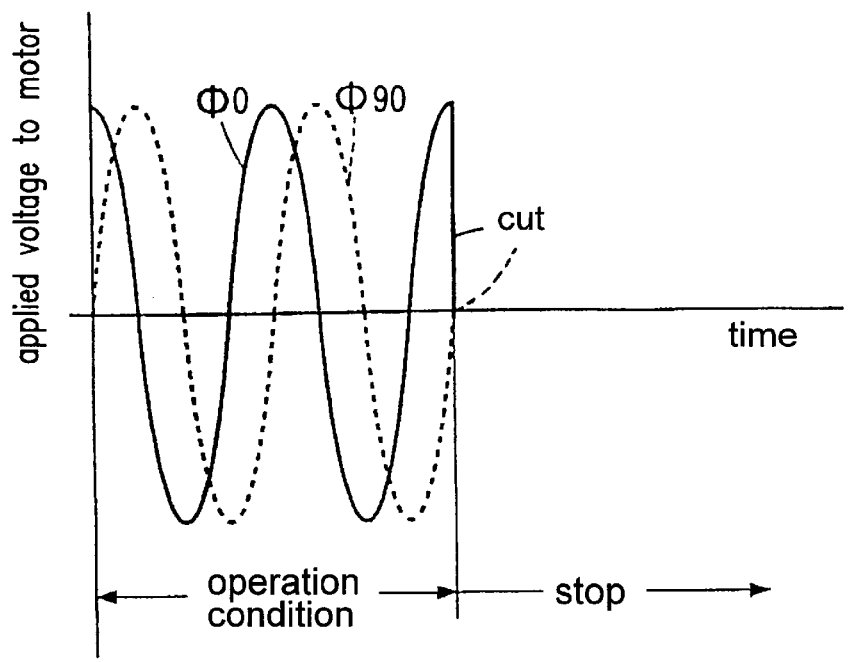
FIG. 17 is an explanatory view for showing a condition at the time of shutting off of a motor apply voltage in a conventional device.
Figure 18:
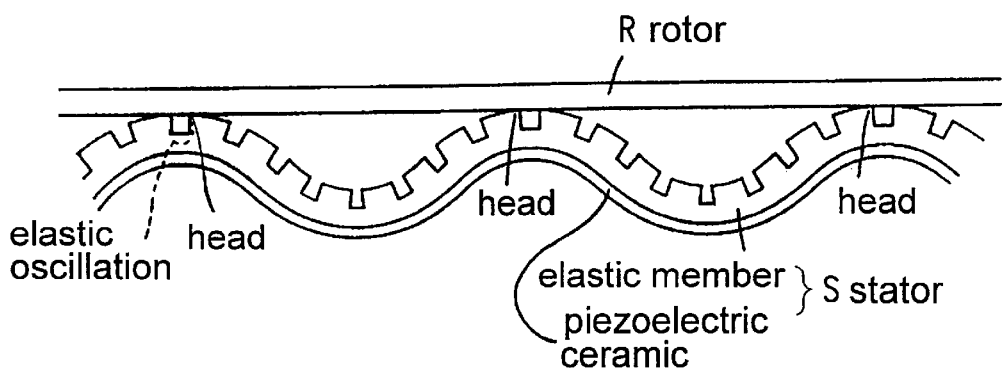
FIG. 18 is an explanatory sectional view for showing a part of the ultrasonic motor in a driving condition.
Figure 19:
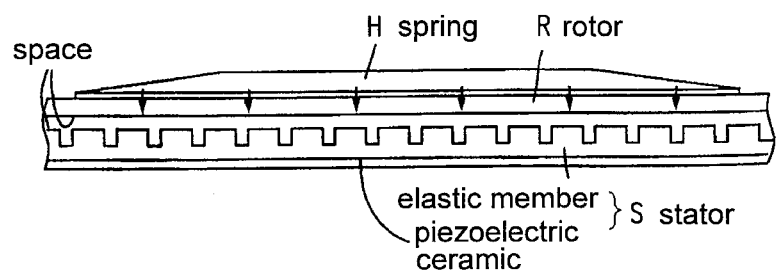
FIG. 19 is an explanatory sectional view for showing a part of the ultrasonic motor in a condition immediately after the motor apply voltage is shut off.
Figure 20:
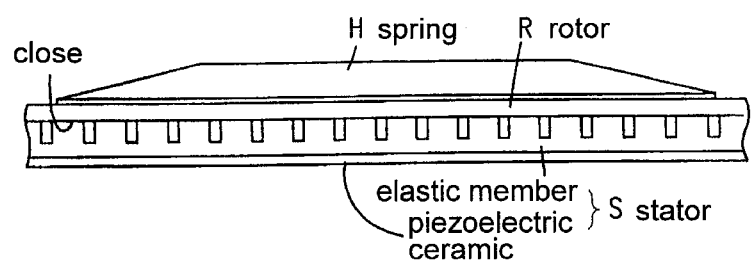
FIG. 20 is an explanatory sectional view for showing a part of the ultrasonic motor in a stopping condition.

FIG. 13 shows a still another example for stopping the motor quietly.

In the previous example, the vibration attenuating device 3' is situated in a circuit between the DC power source 2 and the transformer 6, and is formed of the relay RL and the capacitor C, but as shown in FIG. 13, the drive circuit of this example includes the vibration attenuating device 3' inside the CPU 8. The vibration attenuating device 3' is formed of a frequency changing device 11 for changing the generation cycles, i.e. cycles of generating the timing pulses $P_1$, $P_2$, $P_3$, $P_4$. The frequency changing device 11 generates the timing pulses $P_1$, $P_2$, $P_3$, $P_4$ as in the same cycle indicated in the previous example at the time of driving the ultrasonic motor, and the timing pulses at the time of stopping the motor at a cycle shorter than that at the time of driving the motor. The vibration attenuating device 3' is formed as a software.

The other structures of the drive circuit of the ultrasonic motor of this example are the same as explained in the previous examples.

In the drive circuit or drive control device thus structured, the frequency changing device 11 of the CPU 8 generates the timing pulses $P_1$, $P_2$, $P_3$, $P_4$ in the same cycle in the previous example at the time of driving the ultrasonic motor 7. Therefore, at the time of driving the motor, the transformer 6 outputs the motor apply voltages $\Phi_0$, $\Phi_{90}$ with high frequencies, which are applied to the ultrasonic motor 7.

Also, at the time of stopping the ultrasonic motor 7, the frequency changing device 11 generates the timing pulses $P_1$, $P_2$, $P_3$, $P_4$ at a cycle longer than that at the time of driving the motor. As a result, the motor apply voltages $\Phi_0$, $\Phi_{90}$ as the outputs from the transformer 6 are set to the low frequency voltages, so that the vibration of the ultrasonic motor 7 is once attenuated to the low frequency vibration. Thereafter, the timing pulses $P_1$, $P_2$, $P_3$, $P_4$ from the CPU 8 are ceased to stop the output from the transformer 6, and the ultrasonic motor 7 is finally stopped.

Thus, at the time of driving the motor, since the motor apply voltages $\Phi_0$, $\Phi_{90}$ are set at the high frequency voltages, the vibration of the piezoelectric ceramic b of the ultrasonic motor is large. At the time of stopping the motor, since the motor apply voltages $\Phi_0$, $\Phi_{90}$ are shifted to the low frequency voltages, the vibration of the piezoelectric ceramic b of the ultrasonic motor is once lowered, and then the vibration of the piezoelectric ceramic b is stopped.

As stated above, in the driving control device of the ultrasonic motor in this example, at the time of stopping the motor, after the motor apply voltages $\Phi_0$, $\Phi_{90}$ are shifted to the low frequency voltages to vibrate the piezoelectric ceramic b of the ultrasonic motor at a small frequency, the ultrasonic motor 7 is stopped. Thus, the impact when the rotor R closely contacts the stator S becomes small to prevent the stopping noise.

Also, since the frequency changing device 11 in the CPU 8 is formed as a software, the relay RL and capacitor C as in the previous example are not required. Thus, the number of required parts is reduced.

As apparent from the above description, according to the drive circuit of the ultrasonic motor of the present invention, an alternating current for driving the ultrasonic motor can be easily produced from a direct current. Also, an external information is considered and a rotating condition of the ultrasonic motor is fed back, so that the alternating current to be applied to the ultrasonic motor can be held at the optimum frequency to thereby improve the efficiency of the ultrasonic motor.

Further, according to the drive circuit of the ultrasonic motor of the invention, since there are provided self-diagnosis functions for monitoring raised temperatures of the switching device and transformers and a fault in the rotational condition of the ultrasonic motor, the reliability of the drive circuit of the ultrasonic motor can be improved.

Still further, when the ultrasonic motor is stopped, after the vibration of the stator is attenuated by the vibration attenuating means, the ultrasonic motor is stopped. Thus, the rotor comes close to the stator gradually to slowly contact the stator. Thus, the noise generated when the rotor contacts the stator is suppressed. Therefore, the stopping noise conventionally generated when the ultrasonic motor is stopped is prevented, and the quietness of the ultrasonic motor is provided in all the operation range of the ultrasonic motor.

While the invention has been explained with reference to the specific embodiments of the invention, the explanation is illustrative and the invention is limited only by the appended claims.

What is claimed is:

1. A drive circuit for an ultrasonic motor comprising:

a DC power source;

a transformer for applying to the ultrasonic motor two phase high frequency voltage alternating currents having a predetermined phase difference for driving the ultrasonic motor;

a switching device interposed between the DC power source and the transformer for allowing a direct current from the direct DC power source to flow to the transformer at a predetermined timing;

a first temperature detecting device situated near the switching device for monitoring a temperature rise of the switching device; and a CPU connected to the switching device for controlling the switching device at the predetermined timing and to the first temperature detecting device, said CPU, when a temperature of the switching device detected by the first temperature detecting device is higher than a first set temperature, operating to stop driving of the ultrasonic motor or to lower an output of the ultrasonic motor less than a first predetermined output, and when the temperature becomes lower than a second set temperature lower than the first set temperature, the ultrasonic motor being re-started at an output higher than the first predetermined output.

2. A drive circuit for an ultrasonic motor as claimed in claim 1, further comprising a sine wave conversion device connected to the switching device for converting an output from the switching device into a sine wave to apply to the ultrasonic motor.

3. A drive circuit for an ultrasonic motor as claimed in claim 1, wherein said CPU sets an operation timing of the switching device based on an external information of the ultrasonic motor.

4. A drive circuit for an ultrasonic motor as claimed in claim 1, further comprising a second temperature detecting device connected to the CPU for monitoring a temperature rise of the transformer, said CPU, when a temperature of the transformer detected by the second temperature detecting device is higher than a set temperature, operating to stop driving of the ultrasonic motor or to lower an output of the ultrasonic motor.

5. A drive circuit for an ultrasonic motor as claimed in claim 1, wherein said CPU sets an operation timing of the switching device based on a rotating condition of the ultrasonic motor.

6. A drive circuit for an ultrasonic motor as claimed in claim 1, wherein said CPU receives an information signal of a rotating condition of the ultrasonic motor, and when the CPU detects a fault of the ultrasonic motor based on the information signal, the CPU stops the ultrasonic motor.

7. A drive circuit for an ultrasonic motor as claimed in claim 1, further comprising a vibration attenuating device operated when the ultrasonic motor is stopped so that vibration of a stator of the ultrasonic motor is gradually reduced.

8. A drive circuit for an ultrasonic motor as claimed in claim 7, wherein said vibration attenuating device includes a relay for connecting and disconnecting a line between the transformer and the DC power source, and a capacitor situated in said line between the transformer and the relay.

9. A drive circuit for an ultrasonic motor comprising:

a DC power source;

a transformer for applying to the ultrasonic motor two phase high frequency voltage alternating currents having a predetermined phase difference for driving the ultrasonic motor;

a switching device interposed between the DC power source and the transformer for allowing a direct current from the direct DC power source to flow to the transformer at a predetermined timing;

a temperature detecting device situated near the transformer for monitoring a temperature rise of the transformer; and a CPU connected to the switching device for controlling the switching device at the predetermined timing and to the temperature detecting device, said CPU, when a temperature of the transformer detected by the temperature detecting device is higher than a set temperature, operating to stop driving of the ultrasonic motor or to lower an output of the ultrasonic motor.

10. A drive circuit for an ultrasonic motor as claimed in claim 9, wherein when said output of the ultrasonic motor is lowered, said output is lowered less than a first predetermined output, and when the temperature becomes lower than a second set temperature lower than the first set temperature, the ultrasonic motor is re-started at an output higher than the first predetermined output.

11. A drive circuit for an ultrasonic motor comprising:

a DC power source;

a transformer for applying to the ultrasonic motor two phase high frequency voltage alternating currents having a predetermined phase difference for driving the ultrasonic motor;

a switching device interposed between the DC power source and the transformer for allowing a direct current from the direct DC power source to flow to the transformer at a predetermined timing;

a CPU connected to the switching device for controlling the switching device at the predetermined timing; and a vibration attenuating device operated when the ultrasonic motor is stopped so that vibration of a stator of the ultrasonic motor is gradually reduced, said vibration attenuating device being formed of frequency changing means installed in the CPU, said frequency changing means setting a motor apply voltage to be applied to the ultrasonic motor to a high frequency voltage at a time of driving the ultrasonic motor, and stopping the motor apply voltage after setting the voltage to a low frequency voltage at a time of stopping the ultrasonic motor, said frequency changing means setting a timing pulse generated by the switch device at a shorter cycle at the time of driving the ultrasonic motor and at a longer cycle longer than said shorter cycle at the time of stopping the ultrasonic motor so that the motor apply voltage is set to the high frequency voltage at the time of driving and to the lower frequency voltage at the time of stopping.

* * * * *